Feb. 10, 1925.
E. G. SMITH
CAR AXLE TRANSMISSION
Filed April 17, 1922
1,525,897
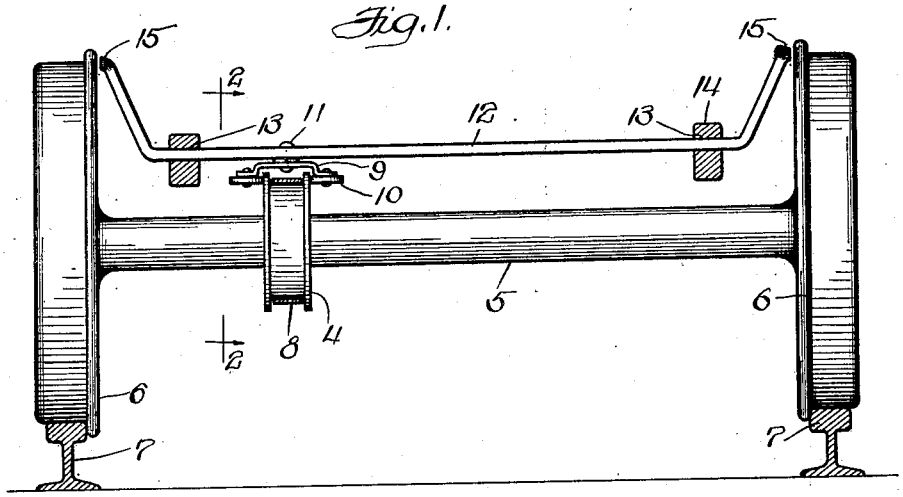
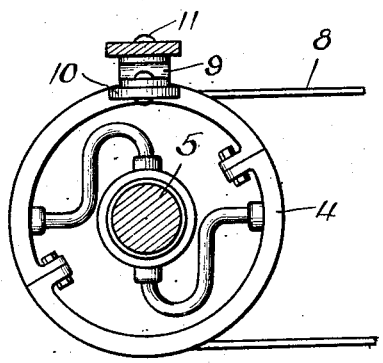
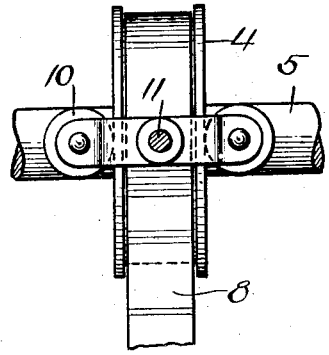
Inventor:
Eugene G. Smith.
By Glenn S. Noble Atty Patented Feb. 10, 1925.

1,525,897

UNITED STATES PATENT OFFICE.

EUGENE G. SMITH, OF CHICAGO, ILLINOIS, ASSIGNOR OF ONE PER CENT TO GLENN S. NOBLE, OF CHICAGO, ILLINOIS.

CAR-AXLE TRANSMISSION.

Application filed April 17, 1922. Serial No. 554,255.

*To all whom it may concern:*

Be it known that I, EUGENE G. SMITH, a citizen of the United States, residing at Chicago, in the county of Cook and State of Illinois, have invented certain new and useful Improvements in Car-Axle Transmissions, of which the following is a specification.

This invention relates to the transmissions used in connection with railway cars for driving the generators and more particularly to improvements in the driving pulley mounting and its guiding means.

The objects of this invention are to provide an improved car axle transmission; to provide a universal driving pulley with means for guiding the same; to provide a guide for a pivotally or universally mounted axle pulley which guide is actuated or controlled by the lateral movement of the wheels and axles or one of such members; and to provide such other features and improvements as will be described hereinafter.

In the accompanying drawings illustrating this invention;

Figure 1 is a front view showing the device applied to a car;

Figure 2 is a sectional side view; and

Figure 3 is a plan view.

In car lighting systems it has been found desirable to mount the generator on the body of the car and drive the same by means of a belt from a pulley on one of the car axles. When ordinary fixed pulleys are used, the transmission has been found unsatisfactory as the belts are apt to be thrown off due to the relative swinging movement of the car axle when the car is passing around a curve and other objectionable features have also been found. In order to improve the transmission, I have provided a universal pulley or a pulley having universal movement with respect to the car axle so that it may be kept in alignment with the belt. It is necessary to support this pulley to keep it in a substantially vertical plane and in some instances I have mounted the support directly on the truck frame. However, there is always more or less lateral movement of the truck frame with respect to the wheels and axles and this movement becomes excessive as the bearings become worn. When the guides are mounted on the truck frame the lateral movement thereof forces them against the universal pulley tending to swing the pulley in an unnecessary and improper manner. In order to avoid this objection, in accordance with the present invention I mount the pulley guide so that it will be controlled by being moved laterally with the wheels and axles instead of with the frame.

In the particular form shown in the drawings, the universally mounted pulley 4 is secured to the axle 5 in any suitable manner. As is usual in railway car construction, the axle 5 is rigidly secured to the wheels 6 which run on the rails 7. The belt 8 passes over the pulley 4 and runs to the pulley on the generator (not shown). The pulley 4 should be held in a substantially vertical plane but on account of its universal mounting a guide is necessary for this purpose. While the guide may be made in various forms it is shown as comprising a yoke 9 with wheels 10 which engage with the sides of the pulley. This yoke is pivotally mounted by means of a bolt or rivet 11 on a cross bar 12 which passes through bearings 13 on the truck frame 14. These bearings may be formed in the frame or may be attached thereto as desired. The outer ends of the bar 12 are bent upwardly and their tips are preferably hardened as shown at 15 to engage with the adjacent faces of the car wheels 6. While these ends are bent upwardly to engage with the outer periphery of the wheels it will be noted that they may be arranged so as to engage with any suitable portion of the wheels or parts connected therewith, the requirement being that the bar with the guide thereon will move laterally with the wheels and axles rather than with the truck frame. By means of this arrangement it will be seen that the pulley guide will be held in substantially fixed relation thereto regardless of the lateral movement of the truck frame 14 and therefore the pulley will be held in substantially fixed position.

It will also be noted that the arrangement of the parts may be changed in order to adapt the device for different types of cars and therefore I do not wish to be limited to the construction shown and described, except as specified in the following claims:

1. The combination with a universally mounted pulley secured to a car axle, of a guide associated with the car wheel for holding the pulley in substantially vertical position.

2. The combination with a car axle and wheels, of a universal pulley rigidly secured to the axle and a guide coacting directly with the wheels and axle for holding the pulley in a pre-determined position.

3. The combination with a railway car having the usual truck frame and wheels and axles, of a driving member having a universal joint connection secured to one of the axles, a guide for said driving member, a support for the guide, bearings on the truck frame for said support, said support being arranged to move laterally with the wheels and axle, substantially as described.

4. The combination with a railway car having the usual truck frame and wheels and axles, of a driving pulley mounted for universal movement on one of the axles, a bar mounted on the truck frame and having its ends adjacent to the wheels and adapted to be engaged thereby to move the same laterally and a guide mounted on said bar and engaging with the pulley.

5. In a device of the character set forth, the combination of a truck frame, a pair of wheels and axle for supporting said frame, a bar slidably mounted in said frame and arranged parallel to the axle, the ends of the bar being arranged in proximity to the wheels so that the bar will be shifted laterally by the wheels, a universal pulley mounted on the axle, a yoke pivotally mounted on said bar and wheels on said yoke engaging with said pulley for holding it upright.

6. The combination with a car having the usual truck frame, wheels and axles, of a pulley mounted for universal movement upon one of said axles and a guide mounted on the truck but actuated by the wheels and axle for holding the pulley in upright position.

EUGENE G. SMITH.